United States Patent [19]

Curtis et al.

[11] Patent Number: 6,161,110
[45] Date of Patent: Dec. 12, 2000

[54] SYSTEM, METHOD AND COMPUTER PRODUCT FOR INTERACTIVELY PRESENTING EVENT DATA

[75] Inventors: Terrill J. Curtis, Pueblo West; John Gavan; Kevin Paul, both of Colorado Springs, all of Colo.

[73] Assignee: MCI Communications Corporation, Washington, D.C.

[21] Appl. No.: 09/073,890

[22] Filed: May 7, 1998

[51] Int. Cl.[7] ...................................................... G06F 17/30
[52] U.S. Cl. .................................. 707/204; 707/3; 707/9
[58] Field of Search .................................. 707/200, 203, 707/10, 104, 3, 204, 9; 705/26, 27; 703/203, 1; 345/356; 379/88.06

[56] References Cited

U.S. PATENT DOCUMENTS

| 5,226,117 | 7/1993 | Miklos | 345/356 |
| 5,255,207 | 10/1993 | Cornwell | 703/1 |
| 5,586,175 | 12/1996 | Hogan et al. | 379/112 |
| 5,606,600 | 2/1997 | Elliot et al. | 379/112 |
| 5,930,768 | 7/1999 | Hooban | 705/27 |
| 5,982,856 | 11/1999 | Cohn et al. | 379/88.06 |

OTHER PUBLICATIONS

"Advanced Information Management", META Group, Inc., Aug. 29, 1994.
Calm, Robert E., "To Catch A Thief", *Forbes ASAP*, pp. 44–45, date unknown.

*Primary Examiner*—Wayne Amsbury
*Assistant Examiner*—Thuy Pardo

[57] ABSTRACT

A system, method and computer program product for interactively enhancing and presenting event data includes an enhancing portion and a presentation server. The enhancing portion includes a case enhancer that uses configuration data and an optional rules-based enhancing engine to enhance cases. The case enhancer includes a first informant that retrieves data from external data systems. The presentation server includes a presentation interface which interfaces one or more client workstations with a case data base. The presentation server also includes a second informant which interfaces the presentation interface with external data systems. The presentation server also includes an enforcer which interfaces the presentation interface with external action systems. A multi-level security system controls access to databases, the second informant and to the enforcer. In an exemplary embodiment, the security system includes a core infrastructure and a domain-specific implementation. The core infrastructure comprises client access rules which specify an upper threshold, or greater realm, of data that a client may access. The domain-specific implementation comprises user access rules which further limit access by individual users. In an exemplary embodiment, the presentation server utilizes display scripts to control display of enhanced event data instead of compiled code. Display scripts may be flagged as prototype display scripts that can be used only by authorized users during runtime.

20 Claims, 11 Drawing Sheets

Case Enhancement

SYSTEM, METHOD AND COMPUTER PRODUCT FOR INTERACTIVELY PRESENTING EVENT DATA

CROSS-REFERENCE TO RELATED APPLICATIONS

This patent application is related to the following commonly owned, U.S. utility patent applications:

1. "System and Method for Detecting and Managing Fraud," Ser. No. 08/928,851 now pending, filed Sep. 12, 1997, by John Gavan, Kevin Paul, Jim Richards, Charles A. Dallas, Hans Van Arkel, Cheryl Herrington, Saralyn Mahone, Terrill J. Curtis and James J. Wagner, and incorporated herein by reference in its entirety;

2. "System, Method and Computer Program Product for a Dynamic Rules-Based Threshold Engine," Ser. No. 09/002, 186, now abandoned, filed Dec. 31, 1997, by John Gavan, Kevin Paul, Jim Richards, Charles A. Dallas, Hans Van Arkel, Cheryl Herrington, Saralyn Mahone, Terrill J. Curtis and James J. Wagner, and incorporated herein by reference in its entirety; and 3. "Network Information Concentrator," Ser. No. 08/426, 256, now U.S. Pat. No. 5,854,834, and incorporated herein by reference in its entirety.

BACKGROUND OF THE INVENTION

1. Field of the Invention

The present invention relates to data presentation and, more particularly, to a system, method and computer program product for interactively and securely presenting data.

2. Related Art

Data presentation systems provide event data to terminals for display to users. Event data may include, for example, telecommunications fraud detection information, consumer credit and debit fraud detection information, purchasing patterns, etc. Event data may come from a variety of sources and may be used for a variety of purposes.

Users may be trained to observe the displayed event data and to detect patterns, such as purchasing patterns, potential fraud, etc. Upon detection of a pattern of interest users may take a variety of actions, such as notifying a supervisor, notifying an account holder or a creditor via phone or mail, etc.

Conventional data presentations systems, however, have several drawbacks. For example, conventional data presentation systems are predominately passive systems in that they present event data from a database substantially without modification. For example, conventional systems do not automatically enhance event data with additional information obtained from external systems, such as user account histories, related event information, etc. Such information could prove very useful in detecting potentially fraudulent patterns.

Conventional data presentation systems typically provide display data to terminals according to pre-coded instructions which may be, for example, compiled C++ programming instructions. Such instructions cannot be revised, updated or field tested without taking the data presentation system off-line. In many situations, data presentation systems are intended to be monitored twenty-four hours a day, seven days a week. In such systems, down time for code revisions, updates and field testing is sparingly authorized. Conventional presentation systems thus often run on out-dated or inferior code until an unexpected fault results in down time.

Conventional data presentation systems do not permit users to actively participate in data processing. For example, users cannot instruct a conventional presentation system to retrieve additional related data such as account payment histories, account usage history, etc. from external data sources. Conventional data presentation systems do not permit users to instruct external action systems, such as customer account systems, to take actions such as deactivating a customer account.

Conventional data presentation systems employ inadequate and inflexible data security systems. Databases, such as telecommunication event databases and consumer credit and debit event databases contain sensitive account data. Such data is prized by those who would engage in fraudulent activities. Managers of event databases generally do not wish to allow users access to sensitive data. Thus, conventional data presentation systems employ a security scheme whereby management determines which data is presented to users. Users cannot retrieve data in addition to that which is presented. Conventional security systems are thus inflexible in that users are very restricted in the types of information that they are provided.

What is needed is a system, method and computer program product for interactively and securely enhancing and presenting data to users.

SUMMARY OF THE INVENTION

The present invention is a system, method and computer program product for interactively enhancing and presenting event data. Event data may be any data which represents events such as telecommunications events, consumer credit card and debit card transaction events, etc. The present invention interactively enhances and presents event data to one or more clients, where each client may include one or more workstations that present the data to users.

In an exemplary embodiment, the present invention comprises an enhancing portion and a presentation server. The enhancing portion retrieves event data from a database, enhances the event data with additional data, which may comprise data from external data sources, and stores the enhanced event data back in the database.

The enhancing portion comprises a case enhancer which controls enhancement of the event data and a configuration database which identifies additional data needed for enhancement. The case enhancer may enhance the event data with data retrieved from external data systems.

The enhancing portion comprises a first informant which interfaces the enhancer to external data systems. The first informant requests data from the external data systems in formats native to the external systems. Data from external data systems may include, for example, bill paying history for an account. The enhancing portion may comprise an optional rules-based enhancing engine which enhances event data based on configurable enhancing rules.

The presentation server comprises a presentation interface which interfaces one or more workstations with the event data. Based upon workstation inputs and user access rights, the presentation server retrieves event data and presents it to client workstations.

The presentation server comprises a second informant which interfaces the presentation interface with external data systems. Based upon workstation inputs, the second informant retrieves data from the external data systems utilizing formats native to the external data systems. The presentation interface presents the retrieved data to the requesting workstation. The presentation interface may also enhance the event data with the retrieved data.

The presentation server comprises an enforcer which interfaces the presentation interface with external action systems. External action systems are systems that can perform actions such as notifying account managers of fraudulent activity, terminating accounts such as telephone and credit accounts, terminating access rights, invalidating calling card numbers, etc. Based upon workstation inputs, the presentation interface directs the enforcer to send appropriate instructions to appropriate external action systems.

The presentation server comprises a security system which controls access to databases, the second informant and to the enforcer. In an exemplary embodiment, the security system comprises a core infrastructure and a domain-specific implementation. The core infrastructure comprises client access rules which specify an upper threshold, or greater realm, of data that a client may access. The domain-specific implementation comprises user access rules which further limit access by individual users. Domain-specific user access rules may be stored as user accounts which are accessed when a user logs on. A manager of the presentation server typically controls the core infrastructure rules. A client may be permitted to control a set of domain-specific implementation rules for the client.

In an exemplary embodiment, the presentation server utilizes display scripts to control display of enhanced event data instead of compiled code. Display scripts may be revised, replaced, added or deleted from the presentation server without affecting other display scripts and, thus, without taking the presentation server off-line.

Display scripts may be flagged as prototype display scripts so that the core infrastructure security rules, for example, will prevent clients from using the prototype display scripts. Prototype display scripts may be tested by an authorized user during run-time, using actual event data, without affecting normal operations of the presentation layer.

Further features and advantages of the present invention, as well as the structure and operation of various exemplary embodiments of the present invention, are described in detail below with reference to the following drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention. The present invention is described with reference to the accompanying drawing Figures.

The present invention will now be described with reference to the accompanying drawings. In the drawings, like reference numbers typically indicate identical or functionally similar elements. Additionally, the left-most digit(s) of a reference number typically identifies the drawing in which the reference number first appears.

DETAILED DESCRIPTION OF THE INVENTION

I. General Overview

The present invention is a system, method and computer program product for interactively enhancing and presenting event data. Event data may include, for example, telecommunications fraud detection information, consumer credit and debit fraud detection information, purchasing patterns, etc. Event data may come from a variety of sources and may be used for a variety of purposes.

Figure 10:
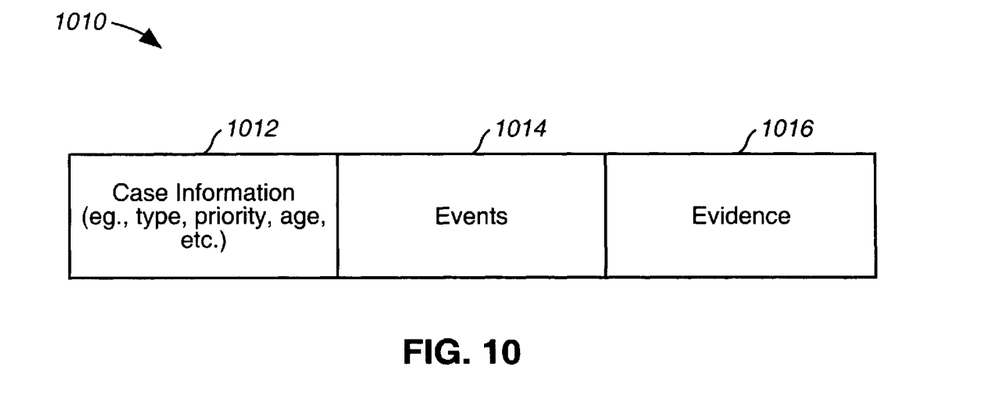
FIG. 10 is a block diagram of an event case that may be enhanced and presented by the present invention.

In this disclosure, a group of related events is referred to as evidence. Events and evidence may be represented by one or more cases. Referring to FIG. 10, a case may be represented by a case table 1010. One skilled in the relevant art will recognize that events may be represented in a variety of manners. The manner in which events are represented does not affect the present invention. In an exemplary embodiment, case table 1010 comprises a case information field 1012, an event field 1014 and an evidence field 1016. Case information field 1012 includes information related to the case which may identify a case type, a case priority, a case age, etc. In a telecommunications fraud detection environment, case types may include, for example, cases of suspected fraudulent use of calling cards, calling numbers, credit cards used to make calls, etc.

Event field 1014 identifies events that contribute to case 1010. For example, in the telecommunications fraud detection example above, event field 1014 may include instances of suspected fraudulent use of a calling card.

Evidence field 1016 identifies groups of related events one or more of which may not be included in event field 1014. For example, in the telecommunications examples above, evidence 1016 may identify telephone calls made within a specified period of time and from the same calling telephone from which suspected fraudulent telephone calls were made with the calling card. One or more of the specific events (i.e., telephone calls) within evidence 1016 may not have been made with the calling card and thus may not be listed in event field 1014.

Case table 1010 may store information related to features of events and/or features of evidence. In a telecommunication fraud detection system, features may include, for example, calling number, called number, automatic number identification (ANI), dialed number identification system (DNIS), etc.

In this disclosure, the term "case" is used to refer to representations of groups of related event data and consolidated event data (i.e., evidence). It should be understood, however, that the term case is used broadly to refer to any type of event data.

The present invention is described herein as a presentation layer that may be incorporated into a multiple layer data processing system. For example, the present invention may be incorporated into the Sheriff Fraud Detection System developed by MCI Corporation of Delaware. The Sheriff Fraud Detection System is disclosed and claimed in, for example, co-pending U.S. patent applications, "System and Method for Detecting and Managing Fraud," Ser. No. 08/928,851, filed Sep. 12, 1997, and "System, Method and Computer Program Product for a Dynamic Rules-Based Threshold Engine," Ser. No. 09/002,186, filed Dec. 31, 1997. Both of the above patent applications are incorporated herein by reference in their entireties.

Briefly, the Sheriff Fraud Detection System is a multi-layer system which includes a detection layer, an analysis layer, an expert systems layer and a presentation layer.

The Sheriff fraud detection layer monitors events which may include, for example, telecommunication events (i.e., telephone calls, credit card transactions, etc.). Events that exceed user-configurable and/or automatically generated configurable thresholds and/or patterns are flagged for further analysis. Related flagged events may be grouped as evidence.

The Sheriff analysis layer analyzes flagged events and/or evidence. The analysis layer consolidates the flagged events and/or evidence into cases, based upon one or more common features. A case thus represents one or more related events or groups of related events (i.e., evidence).

The Sheriff expert systems layer retrieves cases from the case database, further enhances the cases with additional data and initiates external actions for certain cases, without human interaction. The further enhanced cases are stored in the case database.

The presentation layer presents cases to workstations so that human operators may monitor the cases and initiate actions by external systems for selected cases. The present invention may be used as the presentation layer of the Sheriff fraud detection system or for any other system to interactively enhance and present event data to users.

II. Presentation Layer

Figure 1:
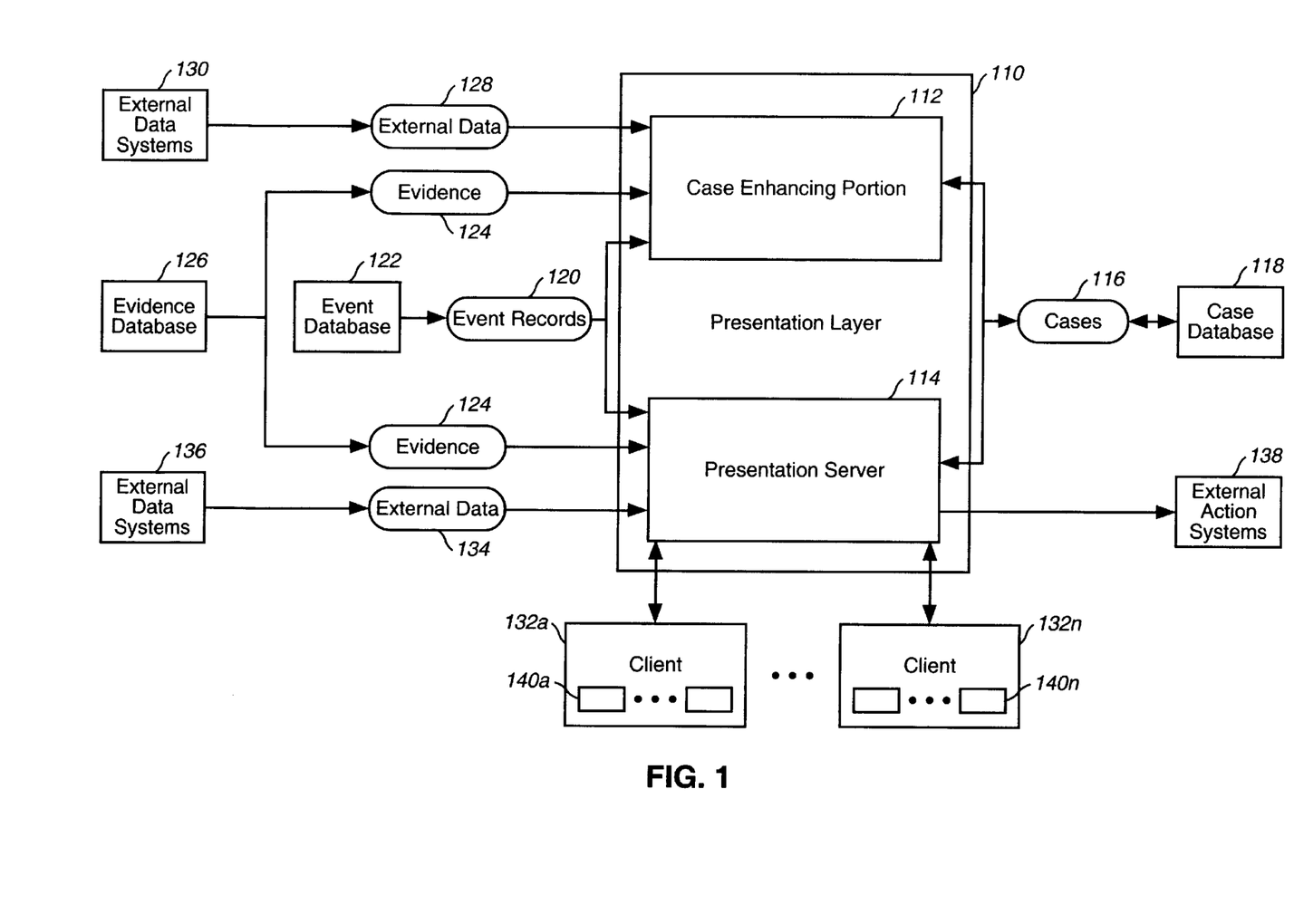
FIG. 1 is a high level block diagram of a presentation layer, in accordance with the present invention.

Referring to FIG. 1, a presentation layer 110 comprises a case enhancing portion 112 and a presentation server 114. Case enhancing portion 112 may be implemented alone or in conjunction with presentation server 114. Similarly, presentation server 114 may be implemented alone or in conjunction with case enhancing portion 112.

Case enhancing portion 112 retrieves cases 116 from a case database 118, enhances them and stores them back in case database 118. Enhancing portion 112 may enhance cases 116 with, for example, event records 120 from event database 122, evidence 124 from evidence database 126, and external data 128 from one or more external data systems 130.

Presentation server 114 retrieves cases 116 from case database 118, which may include cases 116 that were enhanced by case enhancing portion 112. Presentation server 114 presents cases 116 to one or more clients 132. One or more clients 132 may include one or more workstations 140 for presenting cases 116 to human operators.

Presentation server 114 may perform a variety of operations based on requests from clients 132 or workstations 140. For example, presentation server 114 may retrieve additional data and present it to clients 132. Additional data may include event records 120 from event database 122, evidence 124 from evidence database 126 and external data 134 from one or more external data systems 136. External data systems 136 may be part of, or may be included as part of, external data systems 130. Presentation server 114 may further enhance cases 116 with the retrieved additional data.

Based on requests from clients 132, presentation server 114 may also command external action systems 138 to execute one or more actions. External action systems 138 are systems that perform actions such as notifying account managers of fraudulent activity, terminating accounts, terminating access rights, invalidating calling card numbers, debit cards, credit cards, etc. Based upon inputs from clients 132 or workstations 140, presentation server 114 sends appropriate instructions to an appropriate external action system 138.

Presentation layer 110 may interactively present cases 116 and additional data to multiple clients 132 and to multiple workstations 140 of a client 132. For example, the Sheriff Fraud Detection System developed by MCI Inc., may provide event data processing services to multiple clients 132a . . . 132n.

Presentation layer 110 may interactively present different types of cases 116 and different types of additional data to different clients 132. In an exemplary embodiment, presentation layer 110 provides telecommunication fraud detection services to a first client 132a and credit card fraud detection services to a second client 132n. In this exemplary embodiment, cases 116 include telecommunications event cases and credit card event cases. As a consequence, it is contemplated that workstations of client 132a should have access to certain cases 116 while workstations of client 132n should have access to a different set of cases 116. Moreover, in order to maintain integrity of databases 118,122,126, external data systems 136 and external action systems 138, it is contemplated that all clients 132 and workstations 140 should be precluded from accessing certain aspects of databases 118, 122, 126, external data systems 136 and external action systems 138.

A. Security

Figure 2A:
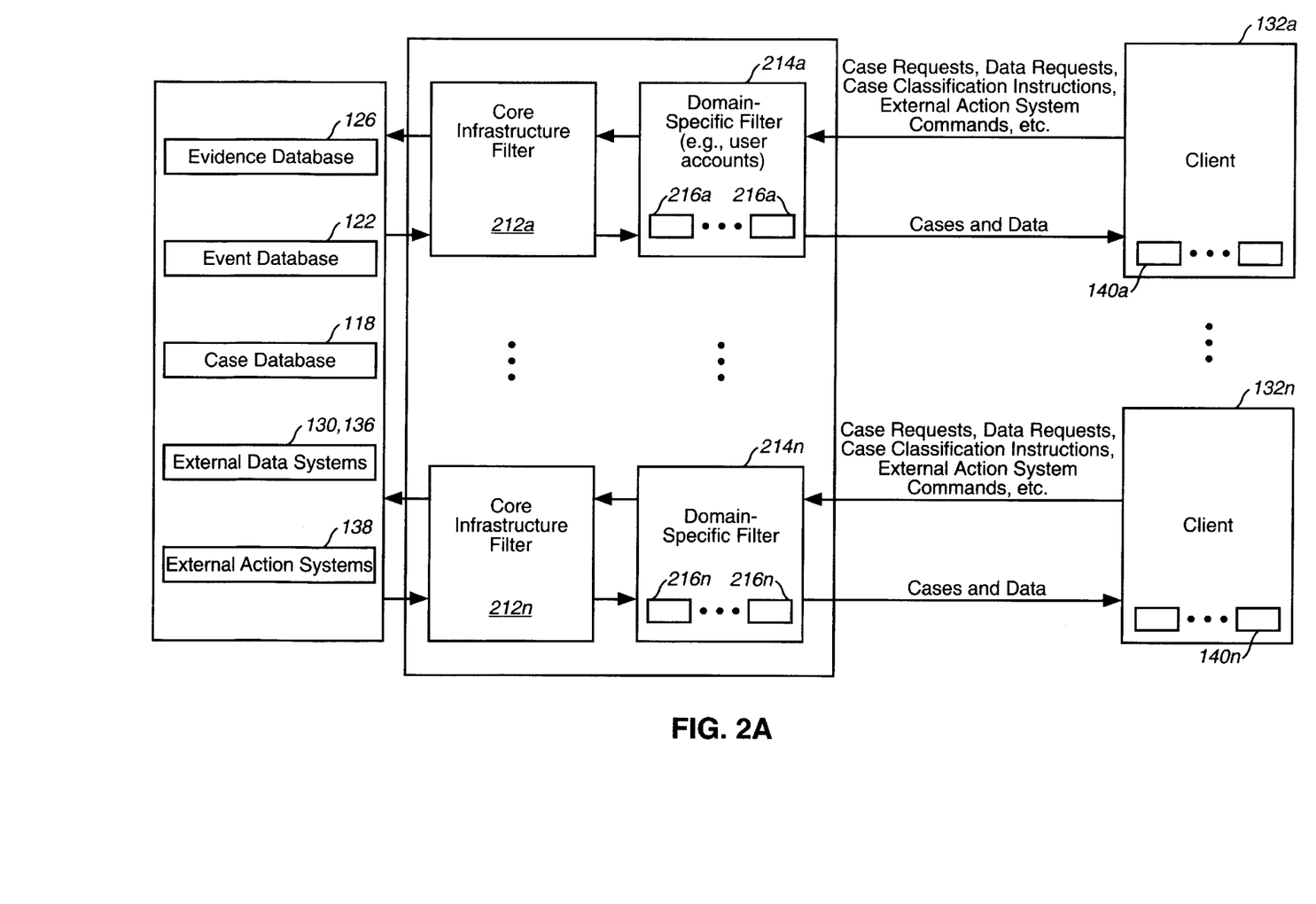
FIG. 2A is a block diagram illustrating a security system which may be implemented as part of the present invention.

Referring to FIG. 2, presentation server 114 preferably comprises a configurable multi-level security system 210. In an exemplary embodiment, security system 210 comprises one or more core infrastructure filters 212 and one or more domain specific filters 214.

Core infrastructure filters 212 prevent one or more clients, including all workstations associated therewith, from accessing certain data and functions of databases 118, 122, 126 external data systems 136 and/or external action systems 138. A separate core infrastructure filter 212 may be maintained for each client 140. Alternately, a single core infrastructure filter 212 may be maintained for all clients 140.

Domain specific filters 214 further limit access to databases 118, 122, 126, external data systems 136 and external action systems 138, according to user access rules. Domain specific filters 214 thus serve as an additional level of configurable filters. There may be any number of domain specific filters 214 for each core infrastructure filter 212. The combination of one or more core infrastructure filters 112 and domain specific filters 214 provide flexibility and configurability to security system 210.

Domain specific filters 214 may be implemented in any of a variety of fashions. In an exemplary embodiment, domain specific filters 214 comprise user accounts 216. Each user account 216 is provided with a set of access parameters. Individual users of workstations 140 may be provided with a logon key associated with a user account 216 so that when a user logs on to presentation server 114, a realm of allowable data and functions are determined.

Figure 2B:
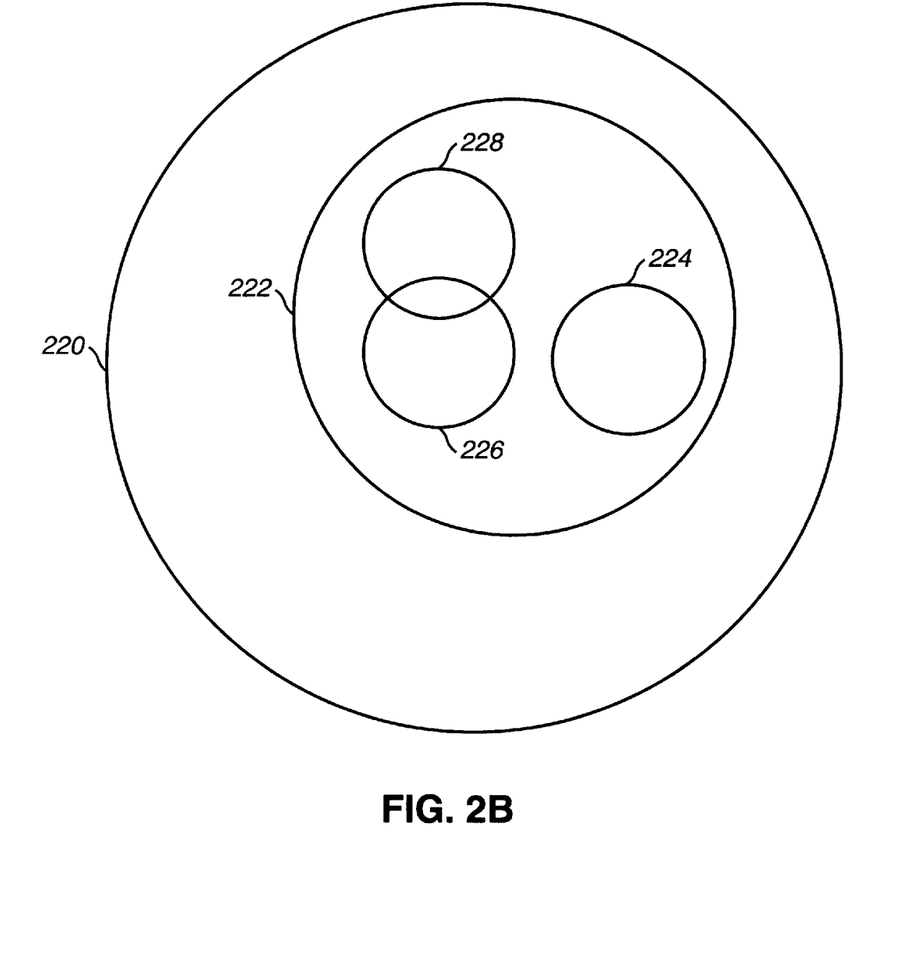
FIG. 2B is a conceptual rendering of realms of data and functions defined by the security system illustrated in FIG. 2A.

For example, referring to FIG. 2B, a circle 220 illustrates the full realm of data and functions that are available to presentation layer 110. Circle 220 may represent, for example, all of the data and functions available from databases 118, 122, 126, external data systems 136 and external action systems 138.

A circle 222 illustrates a realm of data and functions that are provided to one or more clients 132 by a core infrastructure filter 212. Circle 222 may be identical to circle 220 or may fall within circle 220.

Circles 224, 226 and 228 illustrate realms of data and functions that are provided by user accounts 216. One or more of circles 224–228 may be identical to circle 222 or may fall within circle 222. Circles 224–228 may be identical to, exclusive of, or partially overlapping one another.

Referring back to FIG. 2A, a client 132a may be provided partial or full control over an associated domain specific filter 214a. For example, client 132a may contract for access to realm of data 222. (FIG. 2B). Client 132a may then be permitted to set up individual user accounts 216a to further restrict users to realms 224–228. When a user logs on to a workstation 140a of client 132a, the user is identified and associated with a user account 216a, which defines the realm of data and functions that are accessible to the user.

B. Enhancing Portion

Figure 3:
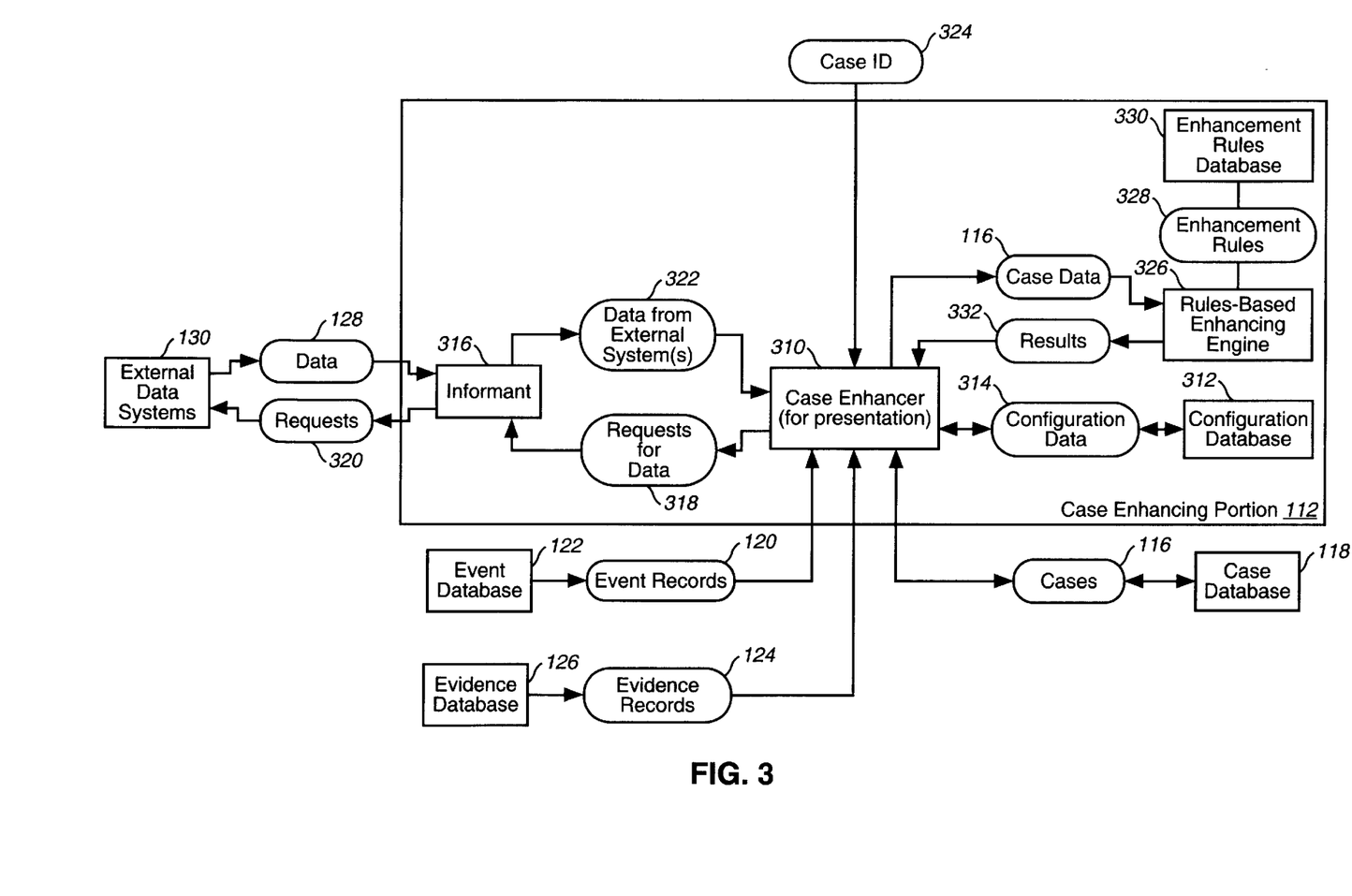
FIG. 3 is a detailed block diagram of the case enhancing portion of the presentation layer illustrated in FIG. 1.

Referring to FIG. 3, a detailed block diagram of case enhancing portion 112 is provided. In an exemplary embodiment, case enhancing portion 312 comprises a case enhancer 310, a configuration database 312, an informant 316 and an optional rules based enhancing engine 326.

Case enhancer 310 is responsible for enhancement of new cases 116. In the depicted exemplary embodiment, case enhancer 310 receives a case identification (ID) 324 for each new case 116 in case database 118. When case enhancer 310 receives a case ID 324, case enhancer 310 retrieves a corresponding case 116 from case database 118.

Case enhancer 310 enhances cases 116 in accordance with configuration data 314, received from configuration database 312. Configuration data 314 may provide instructions for case enhancer 310 to enhance cases 116 and/or a list of data that case enhancer 310 must retrieve to enhance cases 116. Enhancement instructions and/or data identified by configuration data 314 may depend upon the type of event or events that a new case 116 represents. Thus, case enhancer 310 may have to examine new cases 116 to determine what type of event or events they represent before receiving configuration data 314.

Configuration data 314 may also specify features of events, evidence and cases that should be searched for in one or more of case database 118, evidence database 126 and event database 122. For example, a number that was called using a fraudulent calling card number could be searched for in other cases, suspected fraud also included calls to that calling number. If another case is found with a feature of interest, it could be retrieved in order to copy data from it into the present case.

Configuration data 314 may also specify external data 128 that should be included in case 1010. For example, configuration data 314 may specify billing records, etc. to be included in case 1010.

Case enhancer 310 may use informant 316 to retrieve external data 128 from one or more external data systems 130. External data systems 130 may include, for example, a telecommunication account information database. Such a database could supply information related to telecommunication events such as bill paying history for a calling card account, a called number account, a calling number account, etc.

When case enhancer 310 needs to retrieve data from one or more external data systems 130, case enhancer 310 sends requests for data 318 to informant 316. Informant 316 reformats requests 318 into one or more formats that are native to external data systems 130. Reformatted requests are sent by informant 316 as requests 320. External data systems 130 return external data 128 to informant 316, which may, reformat external data 128 into a format native to case enhancer 310. Informant 316 returns data 128 as data 322.

In an exemplary embodiment, case enhancing portion 112 comprises optional rules based enhancing engine 326. Rules based thresholding engine 326 employs configurable enhancement rules 328 from an enhancement rules database 330 to enhance cases 116. Thus, instead of simply adding data to a case, enhancement rules 326 may apply if/then types of instructions to cases 116.

Rules based thresholding engine 326 returns results 332 to case enhancer 310. Results 332 may be in a variety of forms. For example, results 332 may be instructions to search one or more of databases 122, 126 and 118 for additional information. Results 332 may instruct case enhancer 310 to retrieve external data 128 from one or more external data systems 130.

C. Presentation Server

Figure 4:
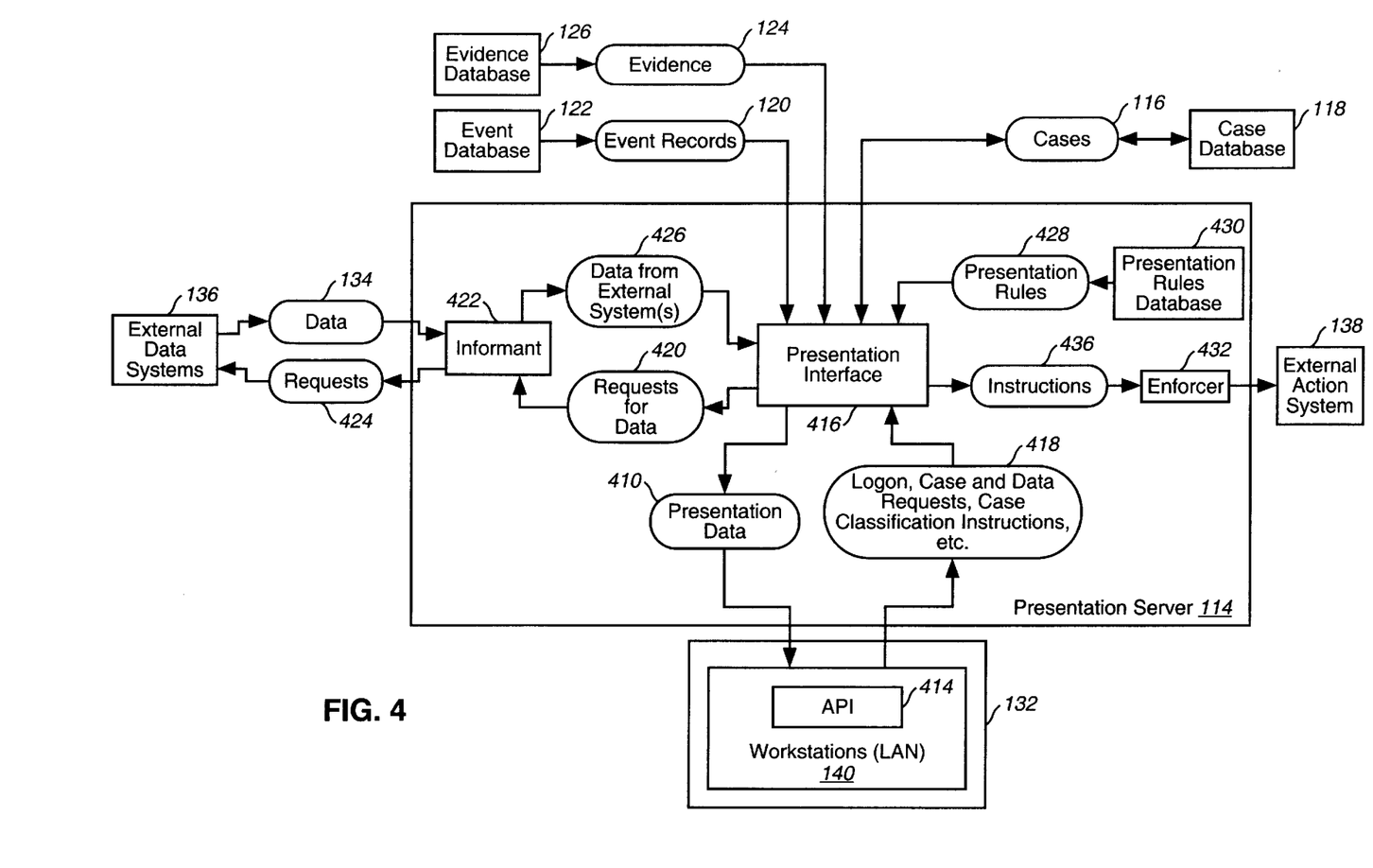
FIG. 4 is a detailed block diagram of the presentation server of the presentation layer illustrated in FIG. 1.

Referring to FIG. 4, a detailed block diagram of a first exemplary embodiment of presentation server 114 is illustrated. Presentation server 114 comprises a presentation interface 416 that interfaces workstations 140 with presentation server 114. Presentation interface 416 sends presentation data 410 to workstations 140 and receives logon requests, case requests, data requests, case classification instructions, etc., 418 from workstations 140.

In this first exemplary embodiment, presentation server 114 comprises presentation rules 428 stored in presentation rules database 430. Presentation interface 416 uses presentation rules 428 to format presentation data 410 for workstations 140. Presentation rules 428 may comprise rules for presenting presentation data 410 to a variety of clients 132 and to a variety of workstations 140 of each client 132. Preferably, clients 132 do not have access to presentation rules database 430.

In this first exemplary embodiment, each workstation 140 comprises an application programming interface 414 that receives presentation data 410, interprets it, and formats it for display at the workstations 140.

Presentation server 114 comprises a second informant 422 which may be similar to informant 316 in case enhancing portion 112 (FIG. 3). Second informant 422 receives requests for data 420 from presentation interface 416 and passes them on to one or more external data systems 136 as requests 424. Second informant 412 may reformat the requests into a format that is native to external data systems 136. Second informant 422 receives external data 134 from external data systems 136 and passes it to presentation interface 416 as data 426. Second informant 422 may reformat the external data before sending it to presentation interface 416.

Presentation server 114 comprises an enforcer 432 for directing actions on external action systems 138. External action systems 138 may include any system that can take an action. For example, external action systems 138 may include a computer that maintains user accounts. Enforcer 432 may instruct the computer to disable a user account, notify an account owner or creditor, etc. Enforcer 432 utilizes instructions 436 from presentation interface 416 which may be generated from instructions 418 from workstations 140.

In operation, when a user at a workstation 140 logs on to presentation server 114, presentation interface 416 retrieves a user account 216 (FIG. 2A) to determine the realm of data and functions 224 (FIG. 2B) that the user is permitted to access. When the user is logged on and the user's realm of access is determined, the user may send case and data requests, case classification instructions, external actions, etc., 418 to presentation interface 416. Presentation interface 416 sends requested cases 116 and external data 134 to a requesting workstation 140, as presentation data 410. Preferably, data requests 418 and presentation data 410 are always subject to constraints imposed by core infrastructure filter 212 and domain specific filter 214 (FIG. 2A).

Figure 5:
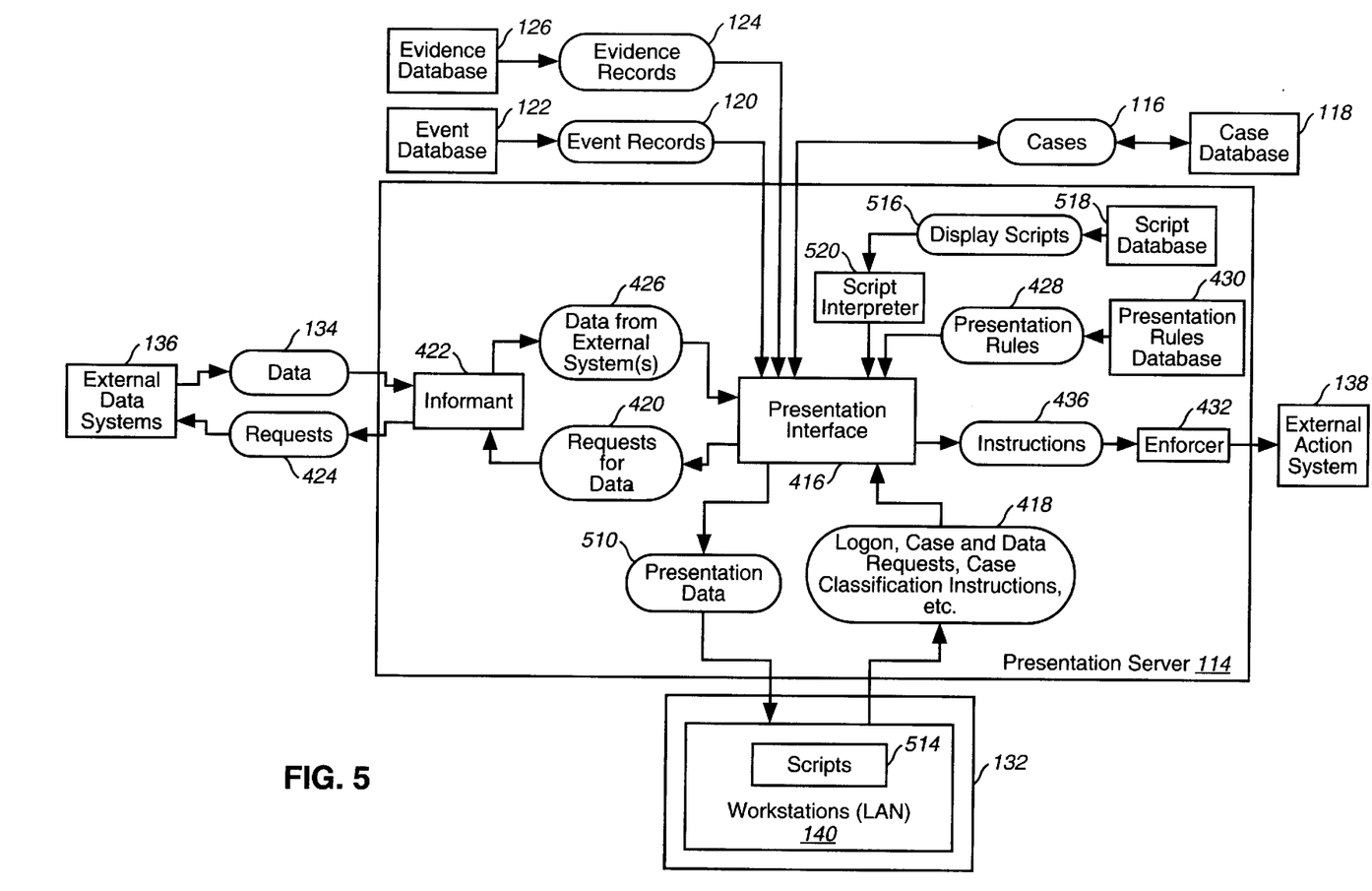
FIG. 5 is a detailed block diagram of the presentation server of the presentation layer illustrated in FIG. 1, including a display script database.

Referring to FIG. 5, a detailed block diagram of a second exemplary embodiment of presentation server 114 is illustrated. A primary difference between the first exemplary embodiment in FIG. 4 and the second exemplary embodiment in FIG. 5 is the use of display scrips 516 in FIG. 5 in place of, or in addition to, presentation rules 428 in FIG. 4. In FIG. 5, presentation interface 416 uses display scripts 516 to generate presentation data 510. Presentation rules 420 are typically fully compiled program code, whereas display scripts 516 are not fully compiled, machine code instructions. An advantage of display scripts 516 is that scripts may easily be added to or removed from script database 518, even during run time. Display scripts 516 permit maintenance and revision during run time. Preferably, display scripts 516 may be tagged as prototype display scripts than can only be used by specified user accounts 216. Authorized users may use the prototype display scripts with actual data without taking any part of presentation layer 110 off-line.

Fully compiled presentation rules 428, on the other hand, generally cannot be updated without recompiling. Thus, updating of presentation rules 428 may require that presentation interface 416, and hence presentation server 114, be taken off-line.

In FIG. 5, presentation server 1 14 also comprises a script interpreter 520 that receives and interprets display scripts 516 for presentation interface 416, as is well known in the relevant art. Display scripts 516 may be stored in a script database 518. Workstations 140 include scripts 514 in place of API 414. Scripts 514 enable workstations 140 to interpret presentation data 510.

Figure 12:
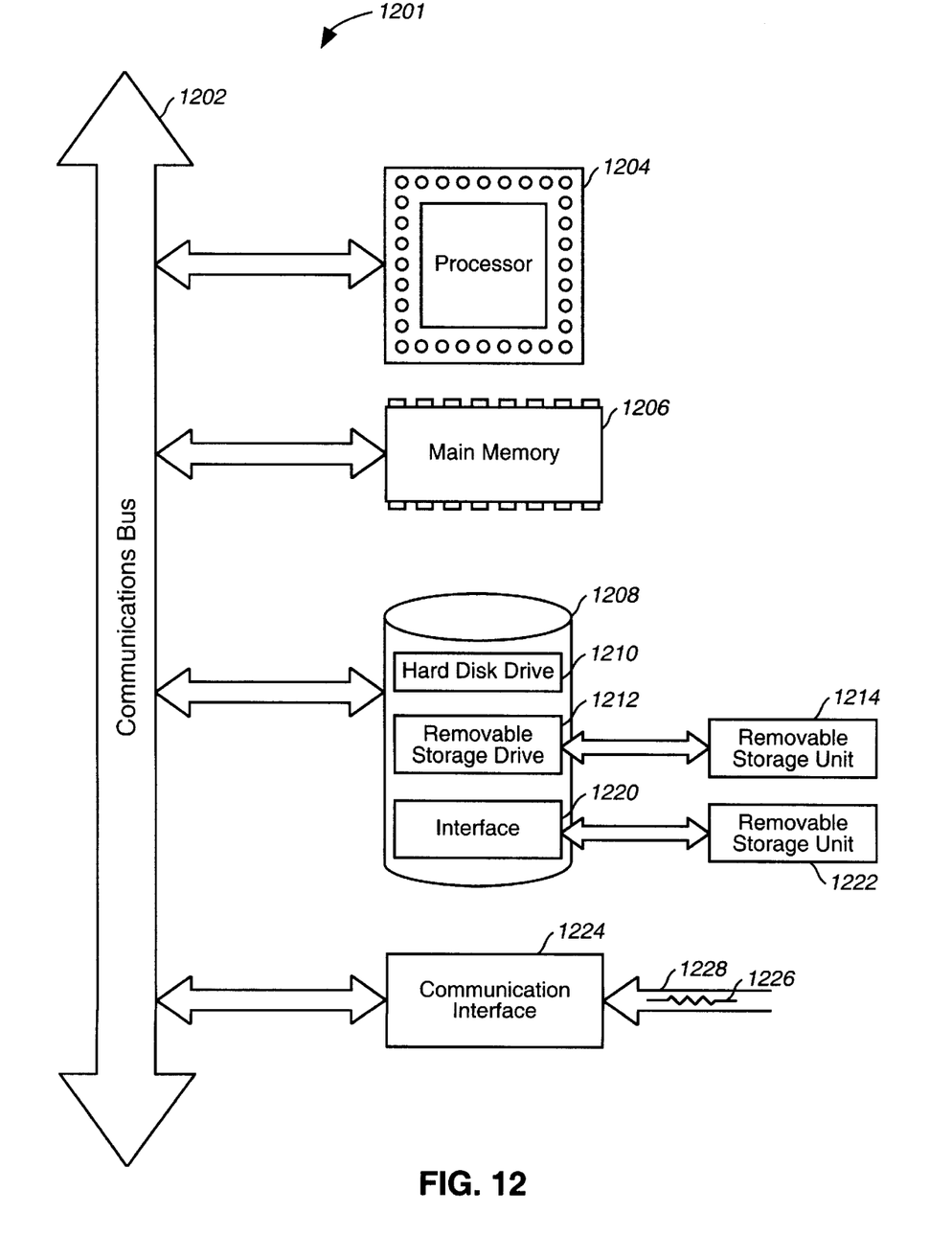
FIG. 12 is a block diagram of a computer on which the present invention may be implemented.

The present invention may be implemented using hardware, software, firmware or a combination thereof and may be implemented in a computer system or other processing system. Referring to FIG. 12, a block diagram illustrates a computer system that may be used to implement the present invention. Various software embodiments are described in terms of this exemplary computer system. After reading this description, it will be apparent to a person skilled in the relevant art how to implement the invention using other computer systems and/or computer architectures.

In FIG. 12, a computer system 1201 includes one or more processors, such as processor 1204. Processor 1204 is connected to a communication bus 1202. Computer system 1201 includes a main memory 1206, preferably random access memory (RAM), and may also include a secondary memory 1208. Secondary memory 1208 may include, for example, a hard disk drive 1210 and/or a removable storage drive 1212, which may comprise, for example, a floppy disk drive, a magnetic tape drive, an optical disk drive, etc. Removable storage drive 1212 reads from and/or writes to a removable storage unit 1214 in a well known manner. Removable storage unit 1214 may comprise, for example, a floppy disk, magnetic tape, optical disk, etc. which is read by and written to by removable storage drive 1212. Removable storage unit 1214 includes a computer usable storage medium having stored therein computer software and/or data.

In alternate embodiments, secondary memory 1208 may include other similar means for allowing computer programs or other instructions to be loaded into computer system 1201. Such means may include, for example, a removable storage unit 1222 and an interface 1220. Examples of such include, but are not limited to, a program cartridge and cartridge interface (such as that found in video game devices), a removable memory chip (such as an EPROM, or PROM) and associated socket, and other removable storage units 1222 and interfaces 1220 which allow software and data to be transferred from the removable storage unit 1222 to computer system 1201.

Computer system 1201 may also include a communications interface 1224. Communications interface 1224 allows software and data to be transferred between computer system 1201 and external devices. Examples of communications interface 1224 include, but are not limited to a modem, a network interface (such as an Ethernet card), a communications port, a PCMCIA slot and card, etc. Software and data transferred via communications interface 1224 are in the form of signals 1226 which may be electronic, electromagnetic, optical or other signals capable of being received by communications interface 1224. Signals 1226 are provided to communications interface via a channel 1228. Channel 1228 carries signals 1226 and may be implemented using wire or cable, fiber optics, a phone line, a cellular phone link, an RF link and other communications channels.

In this document, the terms "computer program medium" and "computer usable medium" are used to generally refer to media such as removable storage device 1212, a hard disk installed in hard disk drive 1210, and signals 1226. Computer program products are means for providing software to computer system 1201.

Computer programs (also called computer control logic) are stored in main memory 1206 and/or secondary memory 1208. Computer programs may also be received via communications interface 1224. Such computer programs, when executed, enable the computer system 1201 to perform the features of the present invention as discussed herein. In particular, the computer programs, when executed, enable the processor 1204 to perform the features of the present invention. Accordingly, such computer programs represent controllers of the computer system 1201.

In an embodiment where the invention is implemented using software, the software may be stored in a computer program product and loaded into computer system 1201 using removable storage drive 1212, hard drive 1210 or communications interface 1224. The control logic (software), when executed by the processor 1204, causes the processor 1204 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

III. Enhancing and Presenting Cases

Figure 6:
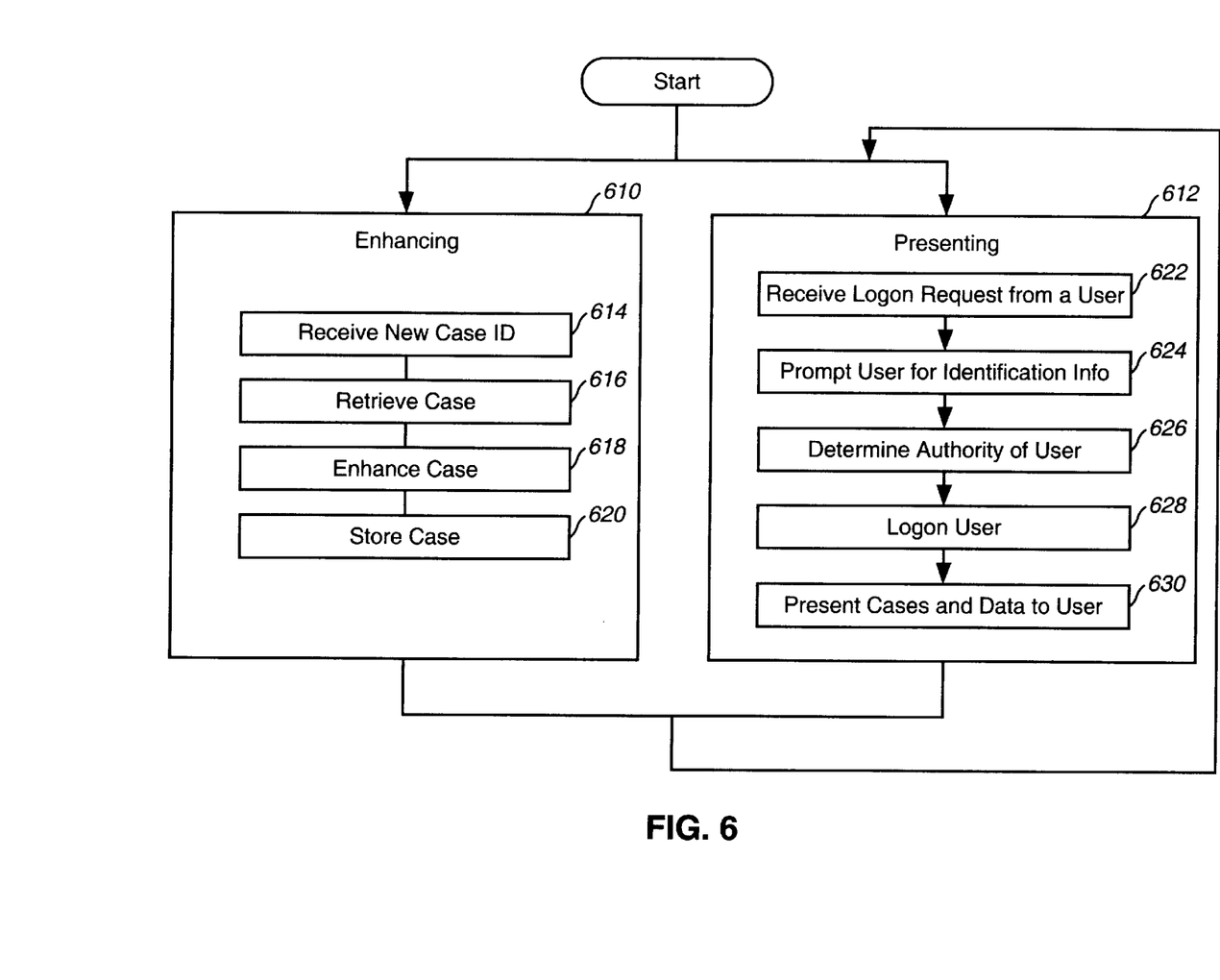
FIG. 6 is a flowchart illustrating a process for enhancing and presenting event data, in accordance with the present invention.

Referring to FIG. 6, a process 610 for enhancing cases and a process 612 for presenting cases is illustrated. Enhancing process 610 may be practiced alone or in conjunction with presenting process 612. Similarly, presenting process 612 may be practiced alone or in conjunction with enhancing process 610. Enhancing process 610 and presenting process 612 may be performed in parallel.

Enhancing process 610 is described herein as performed by case enhancing portion 112 and presenting process 612 is disclosed herein as performed by presentation server 114. These descriptions are provided as examples to illustrate the processes. They are not intended to limit the scope of the invention. One skilled in the relevant arts will recognize that the processes disclosed herein may be performed by a variety of systems and computer program products.

Enhancing process 610 begins at step 614 where case enhancer 310 receives a case ID 324. Case ID 324 corresponds to a case 116 in case database 118. Case 116 may represent an event or a combination events. Case 116 and the event data identified therein may be generated by, for example, an MCI sheriff fraud detection system.

In step 616, case enhancer 310 retrieves a case 116 that corresponds to case ID 324.

In step 618, case enhancer 310 enhances case 116. Referring to FIG. 3, enhancement may comprise using configuration data 314 to identify additional data to add to case 116. Additional data may include event records 120, evidence records 124 and/or external data 128. Thus enhancement may comprise using informant 316 to retrieve external data 128 from one or more external data systems 130. Enhancement may comprise processing enhancement rules 330 in enhancing engine 326.

Figure 11:
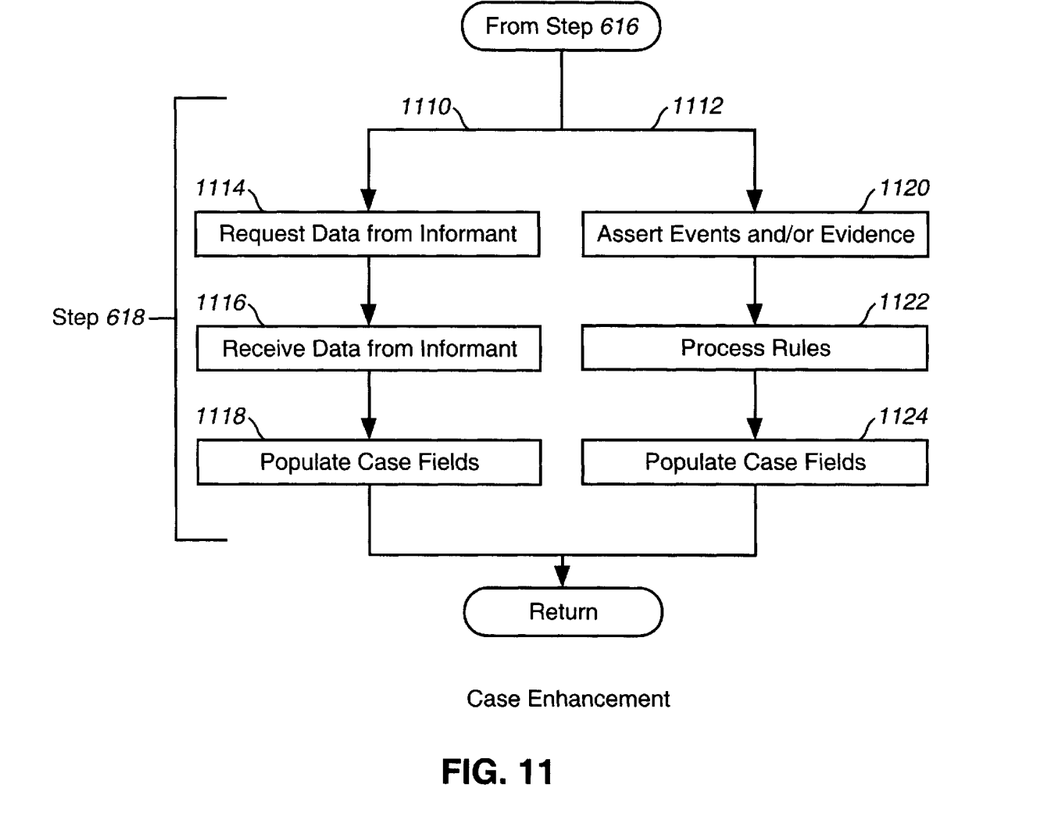
FIG. 11 is a flowchart illustrating a process for enhancing cases, in accordance with the present invention.

Referring to FIG. 11, a detailed process flowchart illustrates an exemplary two-path embodiment of step 618. A first path 1110 illustrates a process for enhancing a case with additional data such as external data 128. A second path 1112 illustrates a process for enhancing a case with configurable enhancement rules 328. Paths 1110 and 1112 may be implemented alone or in combination with one another.

First path 1110 comprises steps 1114–1118. In step 1114, based on configuration data 314, case enhancer 310 requests additional data. Where the additional data includes external data 128, case enhancer 310 sends requests 318 to external data systems 130.

In step 1116, case enhancer 310 receives the requested data. Where the requested data includes external data 128, case enhancer 310 receives external data 128, through informant 316, as data 322.

In step 1118, case enhancer 310 populates one or more of fields 1012, 1014 and 1016 (FIG. 10) with the additional data.

Second path 1112 comprises steps 1120–1124. In step 1120, rules-based enhancing engine 326 receives enhancement rules 328 from enhancement rules database 330. Rules 328 may be selected according to a case type (i.e., the type of event which the case represents (e.g., calling card fraud, collect calling fraud, etc)).

In step 1122, rules-based enhancing engine 326 processes rules 328. Step 1112 may provide additional features, priority levels, etc. for the case 116 being enhanced.

In step 1124, case enhancer 3 10 populates one or more of fields 1012, 1014 and 1016 (FIG. 10) with the results of step 1122.

Referring back to FIG. 6, upon the completion of step 618, processing proceeds to step 620, where case enhancer 310 stores the enhanced case 116 back in case database 118.

Presenting process 612 begins at step 622, where presentation interface 416 receives a logon request 418 from a user at a workstation 140. In step 624, presentation interface 416 prompts the user for identification information. One skilled in the relevant art will recognized that steps 622 and 624 may be performed in a variety of conventional manners.

In step 626, presentation interface 416 determines an authority level of a user. The authority level specifies an extent, or realm, of data and functions that the user may access. Referring to FIG. 2B, in an exemplary embodiment, step 626 determines a user realm 222, 226 or 228 of client realm 222, that the user is permitted to access. The authority level may be determined, in whole or in part, by a user account 216 associated with the user. The user account 216 may be identified by identification information provided by the user in response to step 624.

In step 628, presentation interface 416 logs the user onto presentation layer 110. One skilled in the relevant art will recognized that step 628 may be performed prior to or as an integral part of step 626.

In step 630, presentation interface 416 interactively presents cases and data (e.g., 410 and/or 510) to the user at a workstation (e.g., 412 and/or 512, respectively). Interactive presentation step 630 may comprise receiving data requests, case requests, classification instructions, etc. 418 from the user.

Figure 7:
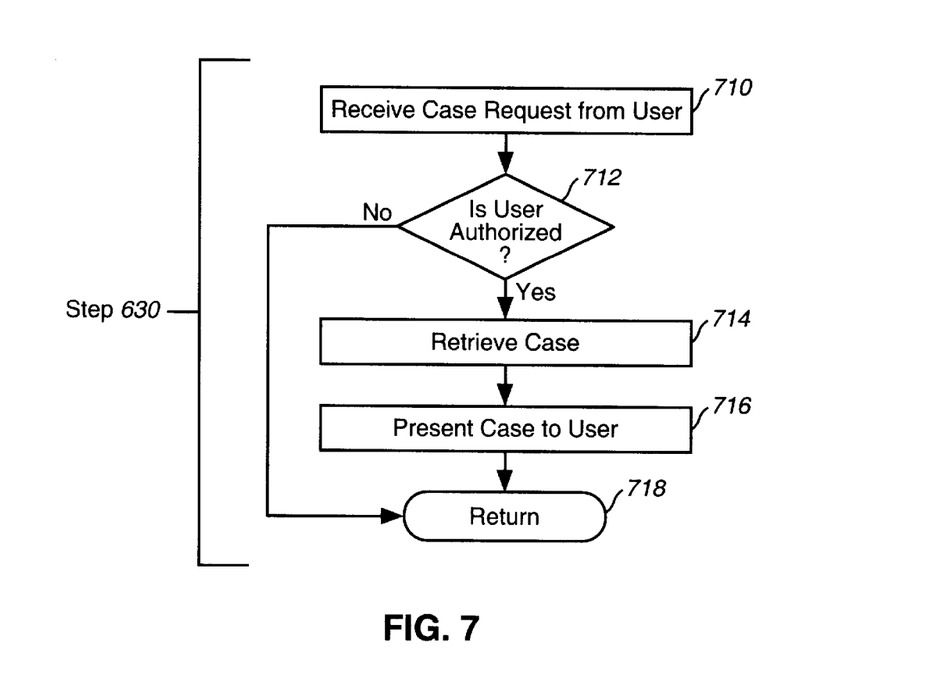
FIG. 7 is a flowchart illustrating a process for retrieving event data, in accordance with the present invention.
Figure 8:
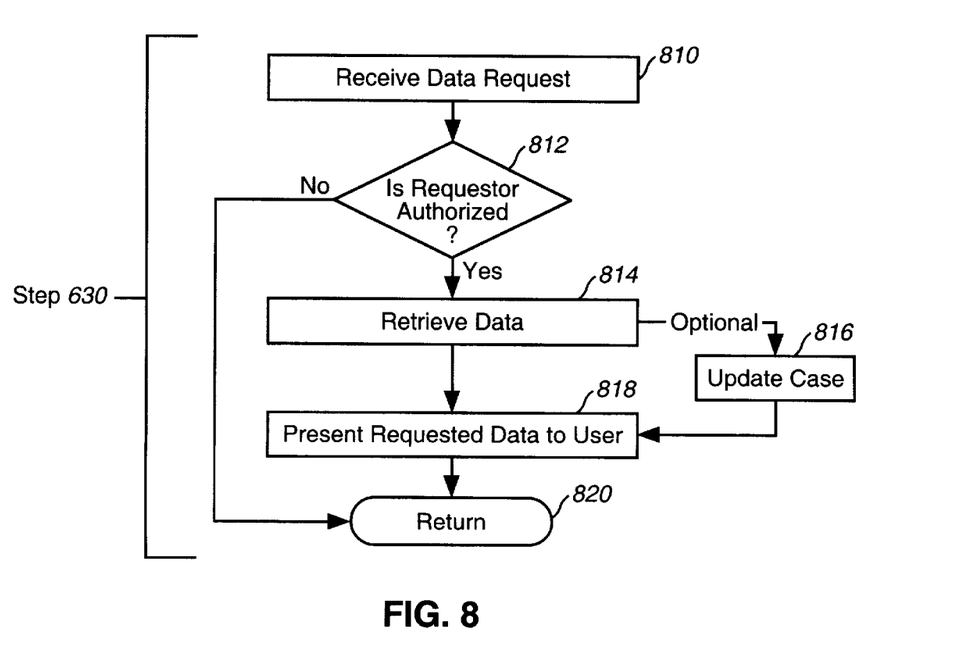
FIG. 8 is a flowchart illustrating a process for retrieving additional data, in accordance with the present invention.
Figure 9:
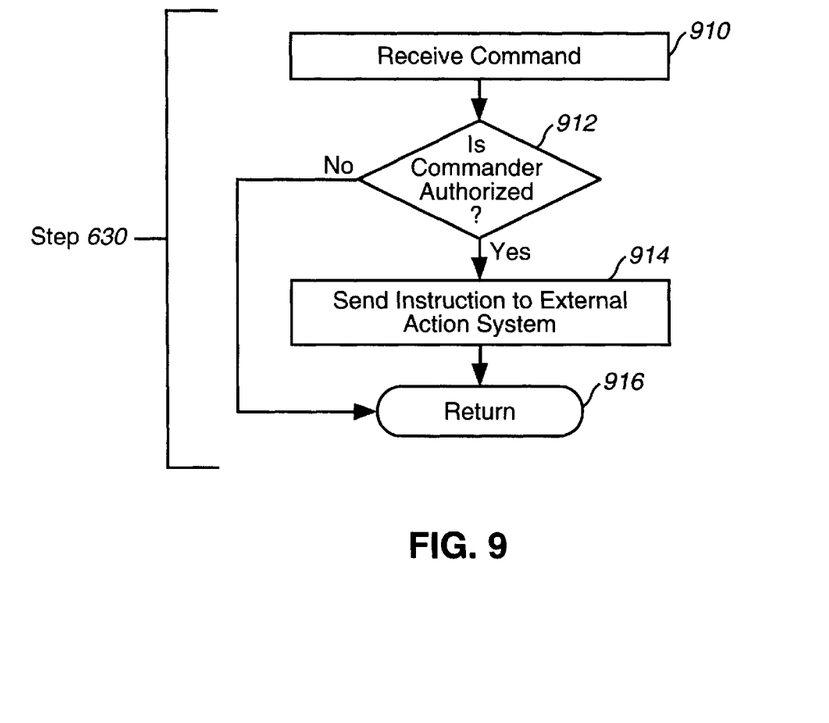
FIG. 9 is a flowchart illustrating a process for sending instructions to external action systems, in accordance with the present invention.

Referring to FIGS. 7–9, exemplary details of step 630 are provided. The exemplary embodiments illustrated in FIGS. 7–9 are a sample of the types of interactions that may take place between presentation server 114 and workstations 140. One skilled in the relevant art will recognize that a variety of other embodiments of step 630 are possible.

Referring to FIG. 7, step 630 is illustrated as steps 710–718, for a situation in which a user requests a case 116. In step 710, presentation interface 416 receives a case request 418 from the user.

In step 712, presentation interface 416 determines whether the user is authorized to view the case. One skilled in the relevant art will recognize that step 712 may be performed at any point in presenting process step 612. One skilled in the relevant art will also recognize that step 712 may be performed by a module other than presentation interface 416.

If the user is not authorized to access the requested case 116, processing jumps to step 718 which returns processing to the beginning of step 630 in FIG. 6. If the user is authorized, processing proceeds to step 714, where presentation interface 416 retrieves the requested case 116 from case database 118.

In step 716, presentation interface 416 presents the requested case 116 to the requesting workstation 140. Presentation interface 416 may utilize presentation rules 428 or display scripts 516 to generate presentation data 410 or presentation 510, respectively. After case 116 is presented to the user, processing proceeds to step 718 which returns processing to the beginning of step 630 in FIG. 6.

Referring to FIG. 8, step 630 is illustrated as steps 810–820, for a situation in which a user requests additional data. Processing begins at step 810 where presentation interface 416 receives a request 418 from a workstation 140 for additional data.

In step 812, presentation interface 416 determines whether the user is authorized to access the requested data. Step 812 is substantially similar to step 712. If the user is not authorized, processing jumps to step 820 which returns processing to the beginning of step 630 in FIG. 6. If the user is authorized, processing proceeds to step 814.

In step 814, presentation interface 416 retrieves the data that was requested in step 810. Presentation interface 416 may, for example, send a request 420 through informant 422 to one or more external data systems 136. Presentation interface may retrieve event records 120 from event data base 122 and evidence 124 from evidence data base 126. Presentation interface 416 may request data from an internal data base.

In an optional exemplary embodiment, processing proceeds to step 816 where presentation interface 416 updates case 116 with the data retrieved in step 814.

From step 814, or from optional step 816, processing proceeds to step 818 where presentation interface 416 presents the data requested in step 810 as presentation data 410 and/or 510. Processing proceeds to step 820 which returns processing to the beginning of step 630 in FIG. 6.

Referring to FIG. 9, step 630 is illustrated as steps 910–916, for a situation in which presentation server 414 receives a command to execute an action at an external action system 138. Processing begins at step 910 where presentation interface 416 receives a command 418 from a work station 140.

In step 912, presentation interface 416 determines whether the user at the terminal 140 is authorized to command the action. Step 912 is substantially similar to steps 812 and step 712. If the user is not authorized, processing jumps to step 916 which returns processing to the beginning of step 630 in FIG. 6. If the user is authorized, processing proceeds to step 914.

In step 914, presentation interface 416 generates instructions 436 and sends to them enforcer 432. Enforcer 432 sends the instruction to an appropriate action system 434. External action system 434 may, for example, terminate an account, send an appropriate notice to an account holder, debit or credit an account, etc.

The exemplary embodiments of step 630, illustrated in FIGS. 7–9 are a sample of the types of interactions that may take place between presentation server 114 and workstations 140. One skilled in the relevant are will recognize that a variety of other embodiments of step 630 are possible.

VI. Conclusions

While various exemplary embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for enhancing and presenting cases that represent one or more event records, such as telecommunications event records, comprising the steps of:
   (1) retrieving a case from a case database;
   (2) retrieving case enhancing instructions for the case;
   (3) interactively identifying and obtaining enhanced input data required to enhance the case in accordance with the case enhancing instructions and enhancing the case in accordance with the case enhancing instructions;
   (4) storing the enhanced case in the case database;
   (5) receiving a request for the enhanced case from a workstation;
   (6) retrieving the enhanced case from the case database;
   (7) presenting the enhanced case to the workstation;
   (8) receiving a request from the workstation for data from at least one interactive source that is relevant to the enhanced case;
   (9) retrieving the requested data;
   (10) presenting the requested data to the workstation;
   (11) further enhancing the enhanced case with the requested data; and
   (12) storing the further enhanced case in the case database.

2. The method according to claim 1, wherein step (3) comprising the steps of:
   (a) retrieving data from an external data source and stored in an external database from the external database; and
   (b) enhancing the case with the data retrieved from the external database.

3. The method according to claim 1, wherein step (3) comprises the step of:
   (a) retrieving event data from an event database;
   (b) enhancing the case with the retrieved event data.

4. The method according to claim 1, wherein step (7) comprises the step of:
   (a) using display scripts to present the enhanced case to the workstation.

5. The method according to claim 4, wherein step (7)(a) comprises the steps of:
   (i) tagging certain display scrips as prototype display scripts;
   (ii) presenting the enhanced case using the prototype display scripts.

6. The method according to claim 1, wherein step (7) comprises the step of:
   (a) limiting access to enhanced cases based upon a client authorization and a user account.

7. The method according to claim 1, wherein step (9) comprises the step of:
   (a) retrieving the requested data from an external database.

8. The method according to claim 1, wherein step (10) comprises the step of:
   (a) limiting access to the requested data based upon a client authorization and a user account.

9. The method according to claim 1, further comprising the steps of:
   (12) receiving a classification instruction for the enhanced case from the workstation; and
   (13) storing a classification identification with the enhanced case in accordance with the classification instruction.

10. The method according to claim 1, further comprising the steps of:
    (13) receiving an instruction from the workstation to execute an external action; and
    (14) instructing an external system to perform the action.

11. The method according to claim 10, wherein step (13) comprises the step of:
    (a) receiving an instruction from the workstation to terminate an account.

12. The method according to claim 10, wherein step (13) comprises the step of:
    (a) receiving an instruction from the workstation to change a personal identification number.

13. The method according to claim 10, wherein step (13) comprises the step of:
    (a) receiving an instruction from the workstation to notify a credit center of potential fraudulent activity.

14. A system for enhancing and presenting cases that represent one or more event records, such as telecommunications event records, comprising:
    a configuration database that stores configuration data that identifies data required to enhance the cases;
    a case enhancer that enhances the cases based upon the configuration data;
    a first informant that interactively interfaces the case enhancer to one or more external databases that contain data initiated in an external system and stored in said one or more external databases for enhancing the cases; and a presentation server that presents the enhanced cases to one or more workstations and that receives instructions and data requests from the one or more workstations.

15. The system according to claim 14, wherein said presentation server comprises:

a second informant that interfaces with one or more external databases that contain data for further enhancing the cases;

an enforcer that interfaces with one or more external action systems based on instructions from the one or more workstations.

16. The system according to claim 14, wherein said presentation server comprises:

a script database that stores display scripts that can be updated during runtime without interrupting normal operations.

17. The system according to claim 14, wherein said presentation server comprises:

a script database that stores prototype display scripts that can be used by authorized workstations during runtime without interrupting normal operations.

18. The system according to claim 14, further comprising:

a core infrastructure filter that applies security rules to a plurality of user accounts a domain-specific filter that applies security rules to individual user accounts.

19. A computer program product for permitting a computer system to enhance and present event data that represents one or more event records, such as telecommunications event records, comprising:

a computer usable medium having computer readable program code means embodied in said medium, said computer readable code means including;

means for causing the computer system to retrieve a case from a case database;

means for causing the computer system to retrieve case enhancing instructions for the case;

means for causing the computer system to interactively identify and obtain enhanced input data required to enhance the case in accordance with the case enhancing instructions and thereafter to enhance the case in accordance with the case enhancing instructions;

means for causing the computer system to store the enhanced case in the case database;

means for causing the computer system to receive a request for the enhanced case from a workstation;

means for causing the computer system to retrieve the enhanced case from the case database;

means for causing the computer system to present the enhanced case to the workstation;

means for causing the computer system to receive a request from the workstation for data from at least one interactive source that is relevant to the enhanced case;

means for causing the computer system to retrieve the requested data;

means for causing the computer system to present the requested data to the workstation;

means for causing the computer system to further enhance the enhanced case with the requested data; and means for causing the computer system to store the further enhanced case in the case database.

20. The computer program product of claim 19, wherein said computer readable first program code means for causing the computer system to present event data comprises:

means for receiving an instruction from the workstation to execute an external action.

* * * * *